United States Patent Office 3,503,718
Patented Mar. 31, 1970

3,503,718
PHOSPHORUS TRIOXIDE-GROUP III COMPOUNDS
Jean G. Riess, Brentwood, and John R. Van Wazer, Ladue, Mo., assignors to Monsanto Company, St. Louis, Mo., a corporation of Delaware
No Drawing. Filed Feb. 21, 1966, Ser. No. 528,799
Int. Cl. C01b 25/26; C07f 9/02
U.S. Cl. 23—315                                 9 Claims

ABSTRACT OF THE DISCLOSURE

The present invention relates to new chemical compounds which embody a phosphorus trioxide moiety $P_4O_6$, combined with metal compounds. The compounds of the invention are useful as intermediates and as catalysts, such as in the polymerization of olefins.

---

The present invention relates to new chemical compounds and the process for making such compounds. It is an object of the invention to provide new chemical compounds which embody a phosphorus trioxide moiety, $P_4O_6$ combined with metal compounds.

The new compounds of the present invention are coordination compounds which in a preferred embodiment of the invention are obtained by addition of Lewis acids or precursors thereof, for example compounds of Group III elements, such as diborane with phosphorus trioxide, $P_4O_6$ to give compounds having a three-dimensional molecular form. These compounds all involve an elaborated bird-cage molecular structure, which provides a complex having metal-phosphorus bonds wherein certain Group II or Group III atoms are also bridged by P—O—P linkages, having covalent compounds built around a tetradentate phosphorus compound.

The general formula for the above described compounds of the present invention is expressed as $$(P_4O_6) \cdot n(MRR'R'')$$

which is also written as $P_4O_6 \cdot (MRR'R'')_n$ where M is at least one metal selected from the group consisting of beryllium, boron, aluminum, gallium, indium and thallium, with a preferred group being the Group III metals, namely boron, aluminum, gallium, indium and thallium, and a most preferred group being boron and aluminum, including mixed compounds which have more than one metal; R, R' and R'' are substituents of the metal, and are selected from the group consisting of hydrogen, a halogen such as fluorine, chlorine, bromine or iodine, hydrocarbyl radicals of from 1 to 20 carbon atoms, such as alkyl radicals having straight chain and branched chain structures including methyl, ethyl, propyl, n-butyl, isobutyl, sec-butyl, tert-butyl, cyclobutyl, decyl, and nonadecyl radicals, aryl and alkylaryl radicals such as phenyl, tolyl, benzyl, and isopropyl-phenyl groups, alkoxyl radicals of from 1 to 20 carbon atoms such as the methoxy, butoxy and decoxy groups, and aroxyl radicals of from 7 to 20 carbon atoms such as the phenoxy and naphthoxy groups. The R, R' and R'' may be the same or different radicals. The symbol $n$ is a whole number from 1 to 4.

The present reaction may be conducted by using various $P_4O_6$ complexes as starting materials to be reacted with the Group III compound. For example $$P_4O_6 \cdot 4Ni(CO)_3$$

may be reacted with $B_2H_6$ to give such intermediate products as $BH_3 \cdot P_4O_6 \cdot 3Ni(CO)_3$ and $2BH_3 \cdot P_4O_6 \cdot 2Ni(CO)_3$ or the completely substituted $4BH_3 \cdot P_4O_6$. Similar intermediate products can be obtained by reacting the $P_4O_6$-Group III complex with transition metal complexes, e.g. $1BH_3 \cdot P_4O_6$ reacts with $Ni(CO)_4$ to give $$1BH_3 \cdot P_4O_6 \cdot Ni(CO)_3$$

and other intermediate members. Still another method of obtaining mixed complex compounds is the simultaneous reaction of $P_4O_6$ with the above Group III compounds, such as $B_2H_6$ and the transition metal complexes such as $Ni(CO)_4$. The generic formula for these compositions is:

$$[P_4O_6] \cdot n[MRR'R''] \cdot m[M'L_r]$$

where, in accordance with the nomenclature set forth above, M is at least one metal selected from the group consisting of beryllium, boron, aluminum, gallium, indium, and thallium, R, R' and R'' are selected from the group consisting of hydrogen, halogen, hydrocarbyl radicals of from 1 to 20 carbon atoms, alkoxyl radicals of from 1 to 20 carbon atoms, and aroxyl radicals of from 7 to 20 carbon atoms, M' is at least one transition metal selected from the group consisting of nickel, cobalt, iron and chromium, L is a coordinating ligand selected from the group consisting of CO and $BF_3$, $n$ is a whole number from 1 to 4, $m$ is a whole number from 0 to 3, $n$ plus $m$ is equal to a number from 1 to 4, and $r$ is a whole number from 1 to 6.

Examples of compounds coming under this formula include $P_4O_6 \cdot 2BH_3$ and $P_4O_6 \cdot 2BH_3 \cdot Ni(CO)_3$.

In a more specific embodiment of the invention embracing the mixed compounds having both a transition metal component and a Group II or Group III component, the preceding formula has the limitation that $n$ is a whole number from 1 to 3, $m$ is a whole number from 1 to 3, $n$ plus $m$ is equal to a number from 2 to 4, and $r$ is a whole number from 1 to 6. An example of a compound coming under this formula is $$P_4O_6 \cdot 2BH_3 \cdot 2Ni(CO)_3$$

More specific formulae within the generic formula are shown below, utilizing boron as a representative Group III metal, which is combined with hydrogen as a representative substituent. Such a compound is described by the formula:

$$P_4O_6 \cdot nBH_3$$

where $n$ is a whole number from 1 to 4. For example, when $n$ is equal to 4, the compound is P, P', P'', P''' tetrakisborane (tetraphosphorus hexaoxide).

Other examples of the group of compounds coming under the specific formula set forth above, and having varied degrees of metal substitution upon the phosphorus trioxide, $P_4O_6$, core are shown in the following examples: $BH_3 \cdot P_4O_6$; $2BH_3 \cdot P_4O_6$; $3BH_3 \cdot P_4O_6$; and $4BH_3 \cdot P_4O_6$.

It has been found that the phosphorus trioxide, $P_4O_6$, is an unusual ligand in coordination chemistry since it is a bird-cage molecule in which the four phosphorus atoms bear pairs of electrons, which may be donated to a Lewis acid, e.g., a compound which has a low lying orbital which it has not yet used in bonding, owing to a shortage of electrons. The Lewis acid components are situated at the corners of a large tetrahedral structure. This means that chelation of a single atom by this tetradentate ligand is not likely to occur although phosphorus trioxide can bind as many as four metal atoms per $P_4O_6$.

The starting compounds and radicals employed with the $P_4O_6$ in the practice of the present invention have the general formula MRR'R'' where M, as set forth above, is at least one metal selected from the group consisting of beryllium, boron, aluminum, gallium, indium and thallium, or preferably boron, aluminum, gallium, indium and thallium, and more preferably boron and aluminum. In the formula, R, R' and R'', which may be the same or different components to balance the valence of M, are selected from the group consisting of hydrogen, halogen, hydrocarbyl radicals having from 1 to 20 carbon atoms, alkoxyl radicals having from 1 to 20 carbon atoms, and aroxyl radicals having from 7 to 20 carbon atoms. In the examples shown below, diborane, $B_2H_6$, is used as a precursor material for the borane radical —$BH_3$ which comes under the above general formula MRR'R''. Other boranes may also be used as precursors or starting materials. The Group III component may furthermore be supplied as a complex, for example $(C_2H_5)_2S \cdot BH_3$ or $PF_3 \cdot BH_3$ or $CO \cdot BH_3$.

The preferred method of preparation of the compounds of the present invention is to mix together phosphorus trioxide with the Group III compound, using the approximate stoichiometric proportion to obtain the desired molecular structure in maximum or near maximum yield. The use of an excess of the Group III metal component aids in carrying the reaction towards definite compounds. For example, when $P_4O_6$ is reacted as a neat liquid with an excess of $B_2H_6$ under one atmosphere pressure of nitrogen, $P_4O_6 \cdot 2BH_3$ is obtained as a crystalline species. In solution with excess $B_2H_6$ and with increasing pressure, the reaction is directed to the formation of crystalline $P_4O_6 \cdot 3BH_3$ and with still higher pressure to $P_4O_6 \cdot 4BH_3$. The temperature may be varied broadly, a preferred range being from $-50°$ C. to $100°$ C., a preferred range for borane being $-20°$ C. to $30°$ C. The pressure as discussed above aids in controlling the course of the reaction, although atmospheric, superatmospheric or vacuum conditions may be desirable for specific starting materials.

The present process may be conducted without the use of a solvent since phosphorus trioxide is easily liquefied (i.e. melting at $23.9°$ C.). Consequently this reactant may also be used as the liquid reaction medium. However, if it is desired to employ a solvent to promote the degree of mixing of the reagents and to improve the speed of quenching the reactants, various organic solvents may be employed, for example saturated hydrocarbons such as pentane, n-octane or dodecane or cyclohexane, ethers such as diethyl ether, or chlorocarbon solvents such as chloroform or carbontetrachloride. The proportion of solvent is not critical. In the case of the crystalline stoichiometric products, a washing-filtration step serves to remove the crystals, other products and unreacted components. For example, the $2BH_3 \cdot P_4O_6$ crystals are washed with a solvent such as cold dry pentane which removes any 1 $BH_3 \cdot P_4O_6$ which remains. The present compounds are stable at low temperatures under an inert gas. Upon heating or when contacted with water, the compounds decompose explosively.

The use of fractional crystallization is a useful method for the separation of the reaction products from the reaction mixture; this procedure is also useful for the separation of compounds having differing degrees of substitution. Other methods which may be used to obtain the products of the present invention include solvent extraction such as by the use of saturated hydrocarbons, e.g. pentane, as the solvent.

Application of the law of mass action permits the preparation of one compound of this invention from another. For example, the reaction of the following equation is carried out in a few minutes at room temperature in an equal volume of chloroform:

$$P_4O_6 \cdot 2BH_3 + P_4O_6 \rightarrow 2(P_4O_6 \cdot 1BH_3)$$

The following examples illustrate specific embodiments of the present invention:

EXAMPLE 1

P,P',bisborane(tetraphosphorus hexaoxide) is prepared by reacting together 1.1 g. (5 millimoles) of liquid phosphorus trioxide, $P_4O_6$, and 112 ml. (5 millimoles) of gaseous diborane at room temperature.

$2BH_3 \cdot P_4O_6$ is precipitated out as a crystalline white powder which is unstable in air, but stable under nitrogen at room temperature. The product $2BH_3 \cdot P_4O_6$ is soluble in saturated hydrocarbons such as pentane, octane, dodecane, and chlorocarbon solvents such as chloroform and carbon tetrachloride. The compound is recrystallized as needles from n-hexane.

The structure of the product P,P',bisborane(tetraphosphorus hexaoxide) is proven by the following nuclear magnetic resonance data. This data, together with the N.M.R. data of other examples, is summarized below.

N.M.R. DATA FOR PHOSPHORUS TRIOXIDE-BORANE COMPLEXES [1]

| | From $P^{31}$ spectra | | | From $H^1$ spectra | | |
|---|---|---|---|---|---|---|
| | $\delta$ Coord. P | $\delta$ Uncoord. P | $J_{P-O-P}$ | $\delta_H$ | $J_{B-H}$ | $J_{P-B-H}$ |
| $P_4O_6 \cdot 1BH_3$ | −90.4 | −118.2 | 27.5 | −0.7 | 102 | 18 |
| $P_4O_6 \cdot 2BH_3$ | −98.7 | −119.2 | 24.7 | −0.65 | 100 | |
| $P_4O_6 \cdot 3BH_3$ | −103.6 | −114.6 | 21 | | | |

[1] $P^{31}$ spectra in n-hexane and $H^1$ spectra on $CHCl_3$. $P^{31}$ chemical shifts, $\delta$ in p.p.m., are referenced to 85% $H_3PO_4$ but are measured with respect to $P_4O_6$ at −113 p.p.m. Proton chemical shifts, $\delta$ in p.p.m., are referenced to tetramethylsilane. Coupling constants, J, are in c.p.s. $J_{P-O-P}$ represents the coupling constants between coordinated and uncoordinated phosphorus atoms.

Additional structural evidence is obtained by following kinetically the formation of P,P',bisborane(tetraphosphorus hexaoxide) by $P^{31}$ N.M.R. In this case, the intermediate species having one borane group per $P_4O_6$ molecule is observed to form and maximize first. This intermediate compound exhibits the correct N.M.R. chemical shifts and splitting (see table above). Other structural evidence is given by the reaction of $2BH_3 \cdot P_4O_6$ with nickel carbonyl to give $4Ni(CO)_3 \cdot P_4O_6$.

EXAMPLE 2

When 5 millimoles of $P_4O_6$ are reacted with 8 millimoles of $B_2H_6$ in 1 ml. of dry chloroform, $CHCl_3$, under a pressure of 10 atmospheres at $25°$ C., and then cooled to $-40°$ C., crystals of trisborane (tetraphosphorus hexaoxide) precipitate which have the empirical formula $3BH_3 \cdot P_4O_6$.

EXAMPLE 3

A mixed metal complex is obtained when 4 millimoles of $P_4O_6$ are first reacted with 2 millimoles of $B_2H_6$, and 4 millimoles of $Ni(CO)_4$ at $25°$ C. and atmospheric pressure. The product has the structural formula:

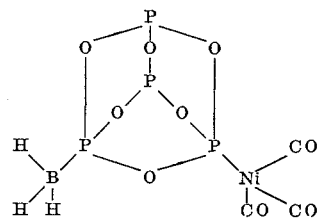

$P^{31}$ N.M.R.:

| | P.p.m. |
|---|---|
| Delta P coordinated to Ni | −132 |
| Delta P coordinated to B | −97 |
| Delta P uncoordinated | −120 |

EXAMPLE 4

The compound having the empirical formula $$Al(CH_3)_3 \cdot P_4O_6$$

is obtained by reacting 1 millimole of $P_4O_6$ with 1 millimole of $Al(CH_3)_3$ at room temperature at atmospheric pressure.

EXAMPLE 5

When 3.3 g. of $P_4O_6$ (15 millimoles) are dissolved in 6 ml. of dry n-hexane and reacted at room temperature with 2 ml. of $BCl_3$ dissolved in n-hexane, an immediate precipitate is obtained from which the liquid phase is separated after centrifugation. The compound (5 g.) is then washed several times with dry hexane, each time followed by centrifugation. The compound is found to have the approximate empirical formula $BCl_3 \cdot P_4O_6$. It is also found in a series of experiments that highly reactive amorphous, insoluble compounds are also immediately precipitated by mixing phosphorus trioxide with the individual reactants, $BBr_3$, $BI_3$, $AlCl_3$, $AlBr_3$, $GaCl_3$ and $InCl_3$ in non-reactive solvents such as pentane, ethyl ether or chloroform.

The metal compounds of the present invention have utility in a number of relationships, for example as intermediates, and as catalysts, such as in the polymerization of olefins, for example ethylene in the absence of hydroxylic compounds.

What is claimed is:

1. A compound having the formula $$[P_4O_6] \cdot n[MRR'R''] \cdot m[M'L_r]$$

where M is at least one metal selected from the group consisting of beryllium, boron, aluminum, gallium, indium and thallium, R, R' and R'' are selected from the group consisting of hydrogen, halogen, hydrocarbyl radicals of from 1 to 20 carbon atoms, alkoxyl radicals of from 1 to 20 carbon atoms, and aroxyl radicals of from 7 to 20 carbon atoms, M' is at least one transition metal selected from the group consisting of nickel, cobalt, iron, and chromium, L is a coordinating ligand selected from the group consisting of CO and $PF_3$, n is a whole number from 1 to 4, m is a whole number from 0 to 3, n plus m is equal to a number from 1 to 4, and r is a whole number from 1 to 6.

2. A compound having the formula $$[P_4O_6] \cdot n[MRR'R''] \cdot m[M'L_r]$$

where M is at least one metal selected from the group consisting of beryllium, boron, aluminum, gallium, indium and thallium, R, R' and R'' are selected from the group consisting of hydrogen, halogen, hydrocarbyl radicals of from 1 to 20 carbon atoms, alkoxyl radicals of from 1 to 20 carbon atoms, and aroxyl radicals of from 7 to 20 carbon atoms, M' is at least one transition metal selected from the group consisting of nickel, cobalt, iron, and chromium, L is a coordinating ligand selected from the group consisting of CO and $PF_3$, n is a whole number from 1 to 3, m is a whole number from 1 to 3, n plus m is equal to a number from 2 to 4, and r is a whole number from 1 to 6.

3. A compound having the formula $$P_4O_6 \cdot n[MRR'R'']$$

where M is at least one metal selected from the group consisting of beryllium, boron, aluminum, gallium, indium and thallium, R, R' and R'' are selected from the group consisting of hydrogen, halogen, hydrocarbyl radicals of from 1 to 20 carbon atoms, alkoxyl radicals of from 1 to 20 carbon atoms, aroxyl radicals of from 7 to 20 carbon atoms, and n is a whole number from 1 to 4.

4. A compound as in claim 3 where M is boron.

5. A compound as in claim 4 where M is boron, R, R' and R'' are hydrogen, and having the formula $$P_4O_6 \cdot nBH_3$$

where n is a whole number from 1 to 4.

6. Process for the preparation of a compound having the formula $$[P_4O_6] \cdot n[MRR'R''] \cdot m[M'L_r]$$

where M is at least one metal selected from the group consisting of beryllium, boron, aluminum, gallium, indium and thallium, R, R' and R'' are selected from the group consisting of hydrogen, halogen, hydrocarbyl radicals of from 1 to 20 carbon atoms, alkoxyl radicals of from 1 to 20 carbon atoms, and aroxyl radicals of from 7 to 20 carbon atoms, M' is at least one transition metal selected from the group consisting of nickel, cobalt, iron, and chromium, L is a coordinating ligand selected from the group consisting of CO and $PF_3$, n is a whole number from 1 to 4, m is a whole number from 0 to 3, n plus m is equal to a number from 1 to 4, and r is a whole number from 1 to 6, which comprises admixing together phosphorus trioxide $P_4O_6$ with at least $n$ moles, per mole of $P_4O_6$, of a compound having the formula MRR'R'', and at least m moles, per mole of $P_4O_6$, of a compound having the formula $M'L_r$.

7. Process for the preparation of a compound having the formula $$[P_4O_6] \cdot nMRR'R'']$$

where M is at least one metal selected from the group consisting of beryllium, boron, aluminum, gallium, indium and thallium, R, R' and R'' are selected from the group consisting of hydrogen, halogen, hydrocarbyl radicals of from 1 to 20 carbon atoms, alkoxyl radicals of from 1 to 20 carbon atoms, and aroxyl radicals of from 7 to 20 carbon atoms, and n is a whole number from 1 to 4, which comprises admixing together phosphorus trioxide $P_4O_6$ with a compound having the formula MRR'R''.

8. Process as in claim 7 in which MRR'R'' is the borane radical —$BH_3$ provided by the use of diborane, $B_2H_6$ and the product is $$P_4O_6 \cdot nBH_3$$

where n is a whole number from 1 to 4.

9. Process as in claim 7 in which MRR'R'' is the borane radical —$BH_3$ provided by the use of one mole, per mole of $P_4O_6$, of diborane, $B_2H_6$, and the product is crystalline $P_4O_6 \cdot 2BH_3$.

References Cited

UNITED STATES PATENTS 3,414,390  12/1968  Riess et al. _____ 23—368 X

OSCAR R. VERTIZ, Primary Examiner

G. O. PETERS, Assistant Examiner

U.S. Cl. X.R.

23—105, 368; 252—437; 260—606.5